United States Patent
Azriel et al.

(10) Patent No.: US 9,020,978 B2
(45) Date of Patent: Apr. 28, 2015

(54) MERGING AND IGNORING CONFIGURATION ITEMS

(75) Inventors: David Azriel, Tel Aviv (IL); Nimrod Nahum, Netzaney (IL); Emil Shmul, Rishon Le-Zion (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 250 days.

(21) Appl. No.: 13/413,790

(22) Filed: Mar. 7, 2012

(65) Prior Publication Data

US 2013/0238666 A1    Sep. 12, 2013

(51) Int. Cl.
*G06F 17/30* (2006.01)
*G06F 9/44* (2006.01)

(52) U.S. Cl.
CPC .......................................... *G06F 8/71* (2013.01)

(58) Field of Classification Search
CPC ................... G06F 17/30525; G06F 17/30578; G06Q 10/00
USPC ......................................... 707/798, 812, 694
See application file for complete search history.

(56) References Cited

U.S. PATENT DOCUMENTS

| | | | |
|---|---|---|---|
| 7,926,031 | B2 | 4/2011 | Faihe et al. |
| 2001/0011265 | A1* | 8/2001 | Cuan et al. ..................... 707/1 |
| 2006/0242207 | A1* | 10/2006 | Tsyganskiy et al. .......... 707/203 |
| 2009/0144319 | A1* | 6/2009 | Panwar et al. ................. 707/102 |
| 2009/0313219 | A1* | 12/2009 | Gupta et al. ..................... 707/3 |
| 2010/0161577 | A1* | 6/2010 | Morozov ....................... 707/705 |
| 2010/0293204 | A1 | 11/2010 | Baker et al. |
| 2011/0016368 | A1 | 1/2011 | Ayachitula et al. |
| 2011/0238637 | A1* | 9/2011 | Morozov et al. .............. 707/694 |
| 2011/0295898 | A1 | 12/2011 | Grabarnik et al. |

OTHER PUBLICATIONS

About Merging Configuration Items, www.Symantec.com, Mar. 22, 2011, http://www.symantec.com/business/support/index?page=content&id=HOWTO45780.

* cited by examiner

*Primary Examiner* — Yuk Ting Choi
(74) *Attorney, Agent, or Firm* — Hewlett-Packard Patent Department

(57) ABSTRACT

Aspects of the present disclosure provide techniques that determine whether each configuration item in a plurality of configuration items is associated with every other configuration item therein. If each configuration item in the plurality of configuration items is associated with every other configuration item therein, the plurality of configuration items are merged such that each attribute associated therewith is associated with one configuration item. If each configuration item in the plurality of configuration items is not associated with every other configuration item therein, it is determined whether at least one configuration item may be ignored.

21 Claims, 6 Drawing Sheets

MERGING AND IGNORING CONFIGURATION ITEMS

BACKGROUND

A configuration management database ("CMDB") is a repository of information related to a system, such as an information technology ("IT") system. A CMDB includes details of configuration items ("CIs"), which are structural units thereof. A CI may be an abstract data object that represents an entity belonging to the system. The entity may be an IT resource, such as a server, a database, or other hardware and software elements.

An entity of a computer system may have various attributes associated therewith. For example, if an entity represents server hardware, an attribute may be an operating system attribute of UNIX, an IP address attribute of 164.2.3.4, and a MAC address attribute of 35938a48-a6f5-4865-b996-b68c2ffd01bb. These attributes may be reflected in the CI representing the entity. Some attributes may be suitable for identifying an instance of a computer system in the short term. Over the long term, however, computer systems may change. Components of a computer system may be upgraded, replaced, removed, added or otherwise altered, until the computer system has few or no original components left. As components are replaced or upgraded, attributes of the computer system also change, which may be referred to as "system drift."

DETAILED DESCRIPTION

As noted above, CIs and attributes associated therewith may change overtime. As these changes take place, redundant CIs may become widespread throughout the CMDB. Such CIs may actually represent a single entity, but may have been altered or entered in the CMDB so as to represent separate entities. Furthermore, some CIs may represent an entity that may have been removed or replaced and no longer exists. Each redundant CI may have different sets of associated attributes. For example, one CI may be associated with an operating system of "Microsoft® Windows® Server 2003 Enterprise Edition service Pack 1" and an IP address of "128.50.15.45." At the same time, another CI representing the same entity may be associated with "Microsoft® Windows® Server 2003 Enterprise Edition service Pack 1" and an IP address of "128.50.15.40." While both CIs have slightly different attributes, they may still represent the same entity. As such, it is desirable to detect such redundant CIs and consolidate them so as to maintain an efficient and accurate representation of CIs in the CMDB. Such arrangement may result in faster access to the CMDB and faster processing of the CIs stored therein. Furthermore, administrators relying on the information stored in the CMDB can be rest assured that the information therein is correct.

In view of the foregoing, aspects of the present disclosure provide a system and method that determine whether each CI in a plurality of CIs is associated with every other CI therein. If each CI in the plurality of CIs is associated with every other CI therein, the plurality of CIs may be merged such that each attribute associated therewith is associated with one CI. In another example, if each CI in the plurality of CIs is not associated with every other CI therein, it may be determined whether at least one newly received CI represents a non-existing entity. If it is determined that at least one newly received CI represents a non-existing entity, the at least one newly received CI may be flagged such that it is subsequently ignored. In a further example, it may also be determined whether at least one stored CI stored in the CMDB represents a non-existing entity. If the at least one stored CI represents the non-existing entity, the at least one stored CI may be removed from the CMDB.

Figure 1:
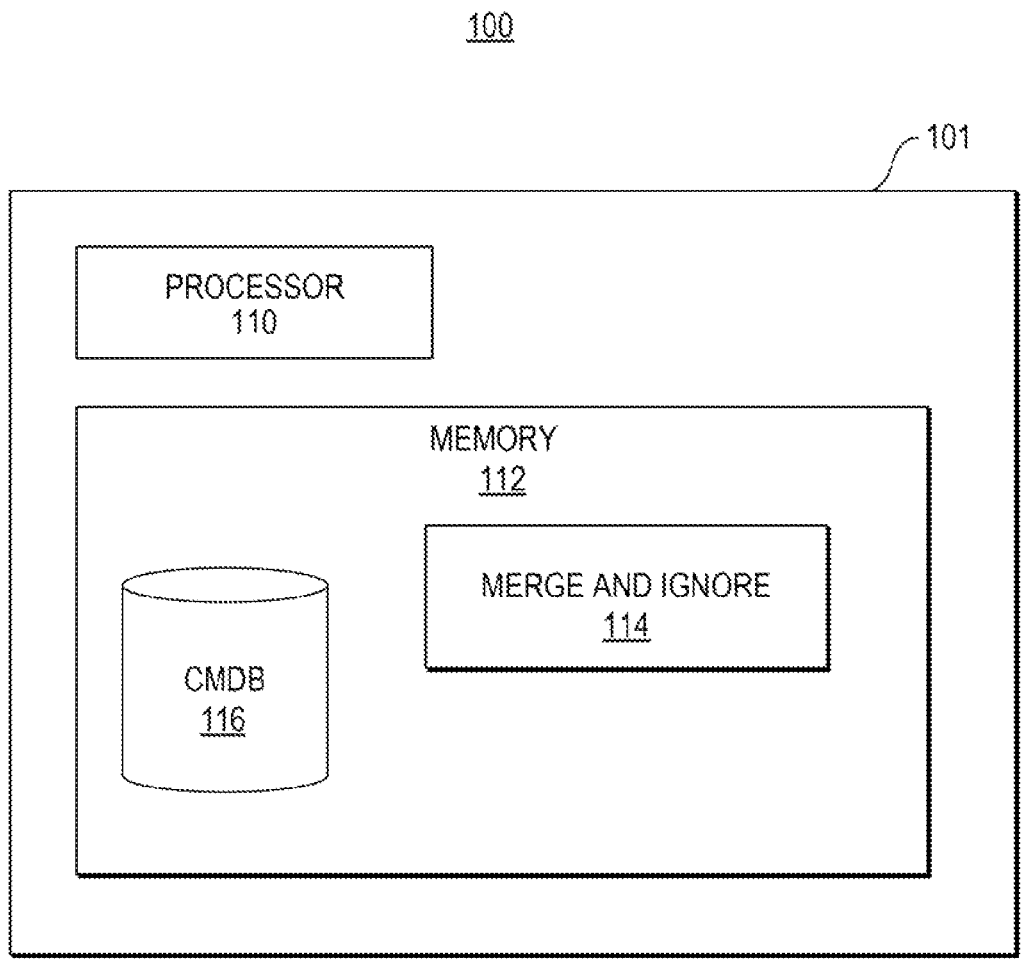
FIG. 1 depicts an illustrative system for implementing the merge and ignore techniques disclosed herein.

FIG. 1 presents a schematic diagram of an illustrative system 100 depicting a computer apparatus 101. Computer apparatus 101 may comprise any device capable of processing instructions and transmitting data to and from other computers, including a laptop, a full-sized personal computer, a high-end server, or a network computer lacking local storage capability. Computer apparatus 101 may include all the components normally used in connection with a computer. For example, it may have a keyboard, a mouse and/or various other types of input devices such as pen-inputs, joysticks, buttons, touch screens, etc., as well as a display, which could include, for instance, a CRT, LCD, plasma screen monitor, TV, projector, etc.

Computer apparatus 101 may be at one node of a network, which may be a local area network ("LAN"), wide area network ("WAN"), the Internet, etc. Such a network and intervening computer devices thereof may also use various protocols including virtual private networks, local Ethernet networks, private networks using communication protocols proprietary to one or more companies, cellular and wireless networks, instant messaging, HTTP and SMTP, and various combinations of the foregoing.

Memory 112 may store merge and ignore instructions 114, which may be retrieved and executed by processor 110. In one example, memory 112 may be a random access memory ("RAM") device. Alternatively, memory 112 may comprise other types of devices, such as memory provided on floppy disk drives, tapes, and hard disk drives, or other storage devices that may be directly or indirectly coupled to computer apparatus 101. Memory 112 may also include any combination of one or more of the foregoing and/or other devices as well. The processor 110 may be any number of well known processors, such as processors from Intel® Corporation. In another example, the processor may be a dedicated controller for executing operations, such as an application specific integrated circuit ("ASIC"). Although FIG. 1 functionally illustrates processor 110 and memory 112 as being within the same block, it will be understood that the processor and memory may actually comprise at least one or multiple processors and memories that may or may not be stored within the same physical housing. For example, any one of the memories may be a hard drive or other storage media located in a server farm of a data center. Accordingly, references to a processor, computer, or memory will be understood to include references to a collection of processors, computers, or memories that may or may not operate in parallel.

Memory 112 may also store CMDB 116. The data stored in CMDB 116 may be retrieved, stored, or modified by processor 110. CMDB 116 may include CIs that each represents an entity belonging to a system. Although the architecture of CMDB 116 is not limited to any particular database structure or product, the data may be stored in computer registers, in a relational database as tables having a plurality of different columns and records, XML documents or flat files. In another example, CMDB 116 may be a data stream. The data stored in CMDB 116 may comprise any information sufficient to identify the relevant data, such as numbers, descriptive text, proprietary codes, references to data stored in other areas of the same memory or different memories (including other network locations) or information that is used by a function to calculate the relevant data.

Computer apparatus 101 may be configured as a database server. In this regard, computer apparatus 101 may be capable of communicating data with a client computer such that computer apparatus 101 uses a network to transmit information for presentation to a user of a remote computer. Accordingly, computer apparatus 101 may be used to obtain database information for display via, for example, a web browser executing on a remote computer. Computer apparatus 101 may also comprise a plurality of computers, such as a load balancing network, that exchange information with different computers of a network for the purpose of receiving, processing, and transmitting data to multiple client computers. In this instance, the client computers will typically still be at different nodes of the network than any of the computers comprising computer apparatus 101.

Merge and ignore instructions 114 may comprise any set of instructions to be executed directly (such as machine code) or indirectly (such as scripts) by the processor(s). In that regard, the terms "instructions," "modules" and "programs" may be used interchangeably herein. The instructions may be stored in any computer language or format, such as in object code or modules of source code. Furthermore, it is understood that the instructions may be implemented in the form of hardware, software, or a combination of hardware and software and that the examples herein are merely illustrative. Functions, methods and routines of merge and ignore instructions 114 are explained in more detail below.

In one example, merge and ignore instructions 114 may be realized in any non-transitory computer-readable media for use by or in connection with an instruction execution system such as computer apparatus 101, an ASIC or other system that can fetch or obtain the logic from non-transitory computer-readable media and execute the instructions contained therein. "Non-transitory computer-readable media" may be any media that can contain, store, or maintain programs and data for use by or in connection with the instruction execution system. Non-transitory computer readable media may comprise any one of many physical media such as, for example, electronic, magnetic, optical, electromagnetic, or semiconductor media. More specific examples of suitable non-transitory computer-readable media include, but are not limited to, a portable magnetic computer diskette such as floppy diskettes or hard drives, a read-only memory ("ROM"), an erasable programmable read-only memory, or a portable compact disc.

A CI may be associated with at least one attribute and each attribute may be assigned a value. By way of example, if a CMDB represents a computer networking system, a CI stored therein may be associated with a number of attributes commonly found in networking systems, such as an operating system, a network address (e.g., IP, MAC), a hardware identifier (e.g., of a motherboard), a host name, and so forth. These attributes may have values such as "Windows NT," "1.2.3.5," "sar4f43se43fd3," and "Sally's computer," respectively. As noted above, many CIs stored in the CMDB may become redundant over time. The presence of redundant CIs in the CMDB may result in slower access thereto and may lead to an inaccurate representation of the system.

Figure 2A:
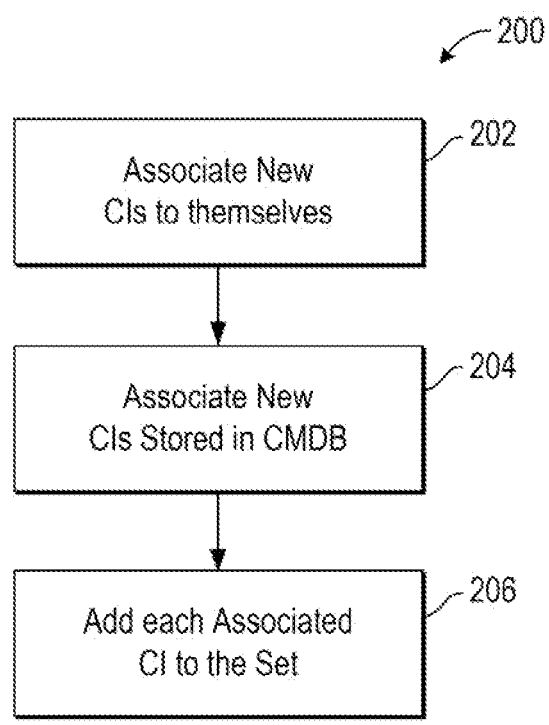
FIGS. 2A-B depict an illustrative process of setting aside and associating newly received and existing CIs that may be deemed candidates for merging or ignoring.

FIG. 2A shows a flow diagram of an illustrative algorithm 200 for setting aside CIs that may be candidates for merging or ignoring. As shown in block 202, newly received CIs may be compared and associated with each other. As shown in block 204, newly received CIs may be compared and associated to existing CIs stored in the CMDB. That is, each CI may be associated with at least one other CI in the plurality of CIs. Such associations may be based on predetermined criteria. The predetermined criteria may include a comparison between an attribute of two CIs, or more particularly, a comparison of values of the attribute that may be meant to identify one CI as potentially being equivalent to another. For example, a given CI in the plurality of CIs may meet the predetermined criteria when at least one attribute associated therewith is equivalent to at least one attribute associated with another CI in the plurality of CIs. Such comparison may be carried out using Identification criteria. Identification Criteria may be applied to newly received CIs and to existing CIs of a CMDB to identify one or more CIs that are potentially equivalent to another. Examples of Identification Criteria usable to compare two or more CIs include whether values of hardware identifier attributes are equal, whether a result of a contain operator between values of MAC address attributes returns "true," whether host name attribute values are equal, and whether a result of a contain operator between IP address attribute values returns "true."

By way of example, a set of attributes that may be included for comparison in Identification Criteria may include serial number, MAC address (to satisfy a contain operator), host name, and IP address (to satisfy a contain operator). In another example, a sequence of attributes may be included for comparison in Match Resolution Criteria. One illustrative sequence may be serial number first, followed by MAC address (again, to satisfy a contain operator), followed by host name. Merge and ignore instructions 114, if executed, may cause the processor to determine whether each CI in a plurality of CIs can be associated with another CI therein based on the predetermined criteria. A given CI in the plurality of CIs may meet the predetermined criteria when at least one attribute associated therewith is equivalent to at least one attribute associated with another CI therein. A CI may have any number of attributes with values that may be compared to values of corresponding attributes of other CIs. For example, a first attribute of a CI may be an IP address. Thus, comparing a first attribute of one CI to a corresponding first attribute of another CI may include comparing the IP address of the one CI to the corresponding IP address of the other CI. Comparing attributes of CIs may include comparing values of the attributes in order to determine whether there is a match. A "match" may occur where the attribute values are equal, where they satisfy a contain operator, or where they satisfy some other operator.

Returning back to FIG. 2A, each associated CI may be set aside and deemed a candidate for merging or ignoring, as shown in block 206: A comparison of CI attribute values may yield various results. As noted above, attribute values may "match" when a comparison between them satisfies a particular type of operator, such as equals or contains. In contrast, attribute values may "mismatch" where they conflict, such as by having values that are different or that fail various comparison operators. A third result may occur where a CI involved in a comparison has an attribute value that is empty. An attribute may have an empty value where the attribute value is unpopulated, was never populated, is NULL (e.g., 0x0, NUL, /dev/null or a null pointer), is equal to 0 or "N/A," and so forth. An empty attribute value may not be helpful in determining whether CIs are equivalent, and so additional CI attributes may be compared.

Figure 2B:
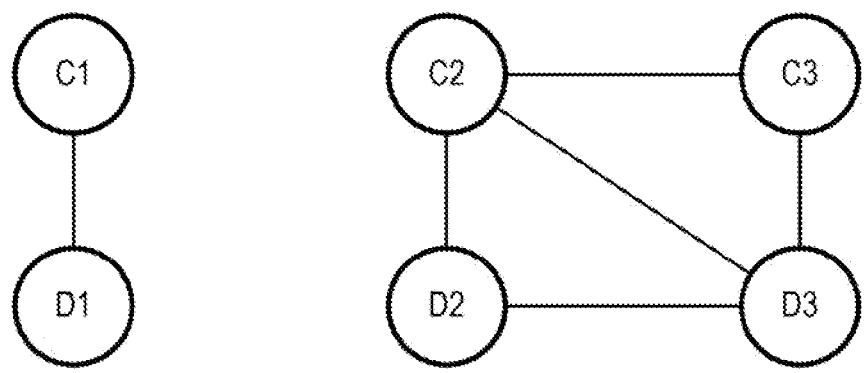

FIG. 2B shows an illustrative set of CIs that may be set aside as candidates for merging or ignoring. In FIG. 2B, C1, C2, and C3 may be newly received CIs and D1, D2, and D3 may be stored CIs that currently exist in the CMDB. The merge and ignore instructions, if executed, may cause processor 110 to represent each CI as a node in a graph of nodes, as shown in FIG. 2B.

Figure 3A:
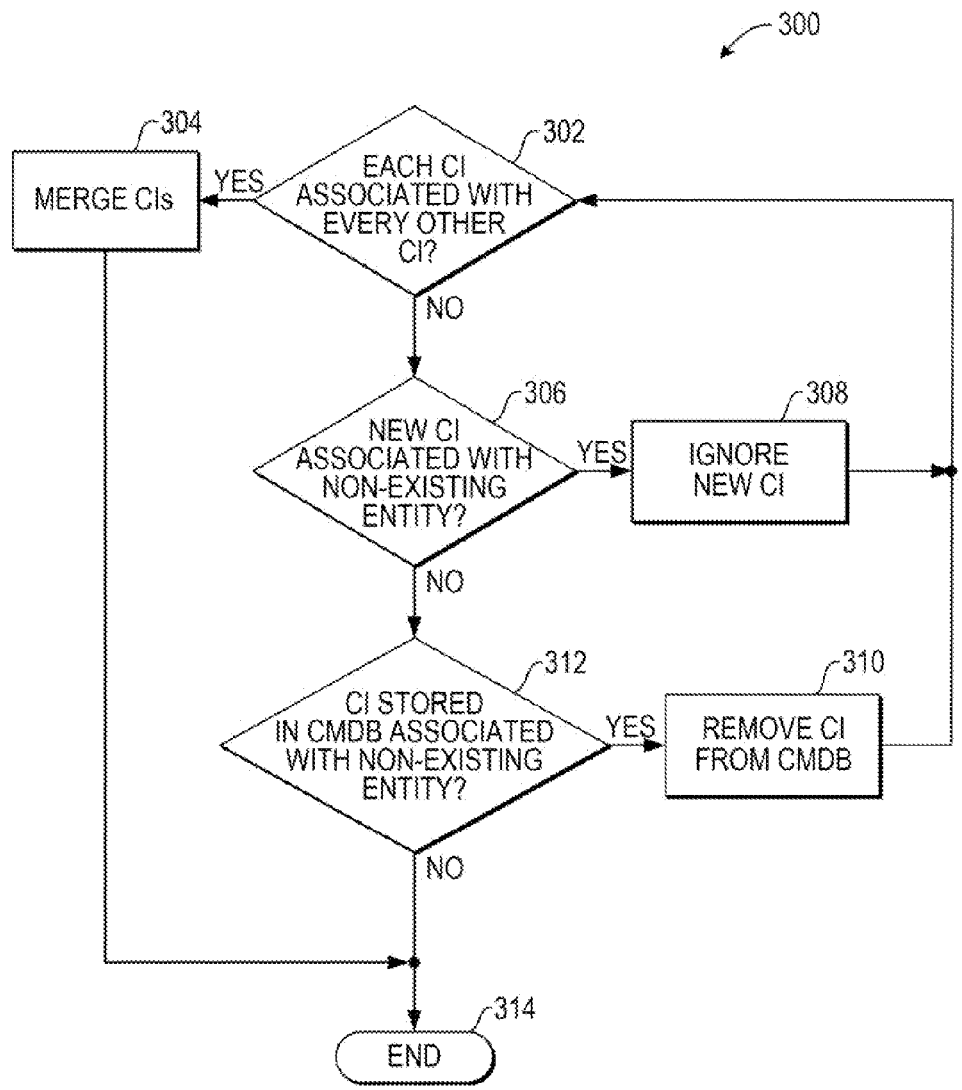
FIG. 3A is a flow diagram of an illustrative process for merging and ignoring in accordance with aspects of the present disclosure.

One working example of a system and method to merge or ignore CIs is illustrated in FIGS. 3A-4D. In particular, FIGS. 3A and 4A illustrate flow diagrams in accordance with aspects of the present disclosure. FIGS. 3B and 4B-4D are working examples demonstrating various aspects of merging and ignoring of CIs. The actions shown in FIGS. 3B and 4B-4D will be discussed below with regard to the flow diagrams of FIGS. 3A and 4A.

FIG. 3A shows an illustrative method 300 for merging or ignoring CIs in a CMDB. As shown in block 302 of FIG. 3A, it may be determined whether each CI in a plurality of CIs is associated with every other CI therein. This may be carried out using known graph algorithms, such as the Bron-Kerbosch algorithm. As noted above, a given CI in a plurality of CIs may be associated with another CI therein if the given CI meets the predetermined criteria. If the given CI meets the predetermined criteria, the node representing the given CI may be linked to another node representing the other CI. The plurality of CIs may be the CIs set aside as candidates for merging or ignoring, which may include newly received CIs and CIs already stored in the CMDB. In block 304 of FIG. 3A, if it is determined that each CI in a plurality of CIs is associated with every other CI therein, the plurality of CIs may be merged such that each attribute associated therewith is now associated with one CI. After the CIs are merged, the process may end, as shown in block 314.

Figure 3B:
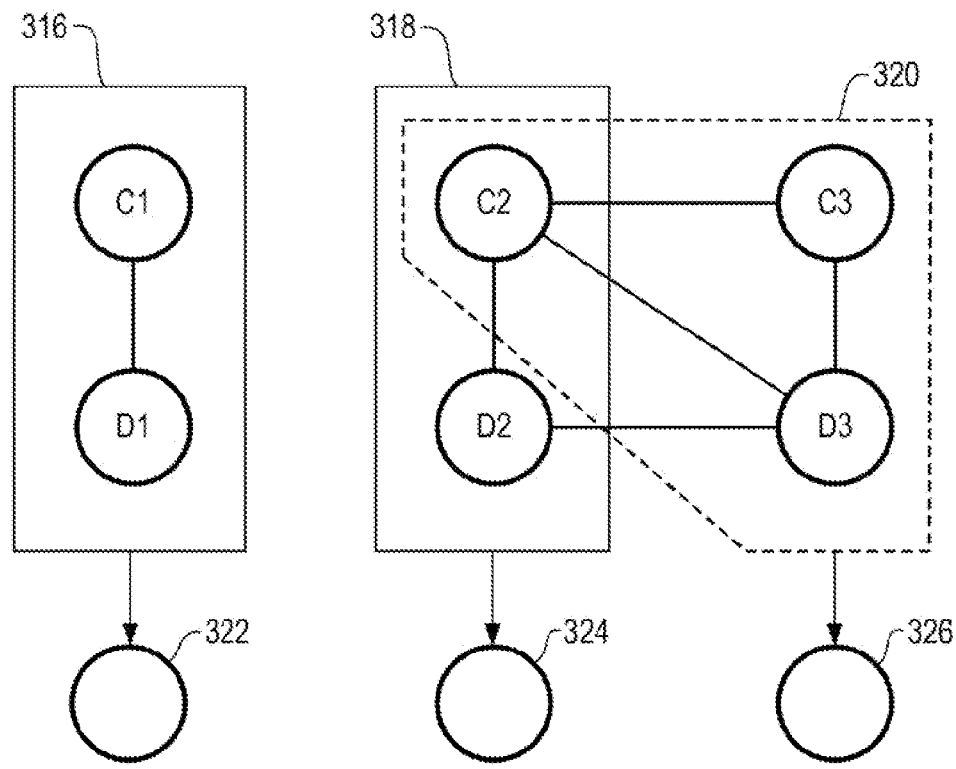
FIG. 3B is a working example of merging CIs in accordance with aspects of the present disclosure.

FIG. 3B shows the CIs set aside as candidates for merging and ignoring that were shown in FIG. 2B. FIG. 3B shows three pluralities of CIs. Each CI contained in each plurality is associated with every other CI therein. In plurality 316, C1 is associated with D1; in plurality 318, C2 is associated with D2; finally, in plurality 320, C2, C3, and D3 are all associated with each other. In this example, each plurality may be merged such that the attributes associated with the CIs therein are associated with one CI. As shown in FIG. 3B, plurality 316 may be merged into CI 322, plurality 318 may be merged into CI 324, and plurality 320 may be merged into CI 326.

Referring back to FIG. 3A, in block 306, if each CI in a plurality of CIs is not associated with every other CI therein, it may be determined whether at least one newly received CI is associated with a non-existing entity or an entity that does not exist in the system. In block 308, if the at least one newly received CI is associated with a non-existing entity, the CI may be flagged such that it is subsequently ignored. In block 312, if each CI in a plurality of CIs is not associated with every other CI therein, it may also be determined whether at least one CI stored in the CMDB is associated with a non-existing entity. If the at least one CI stored in the CMDB is associated with a non-existing entity, the CI may be removed therefrom, as shown in block 310. At this point, the Process may loop back again to block 302. In one example, the process may repeat until all CIs are merged or until all CIs can no longer be associated with any other CI in the plurality of CIs.

Figure 4A:
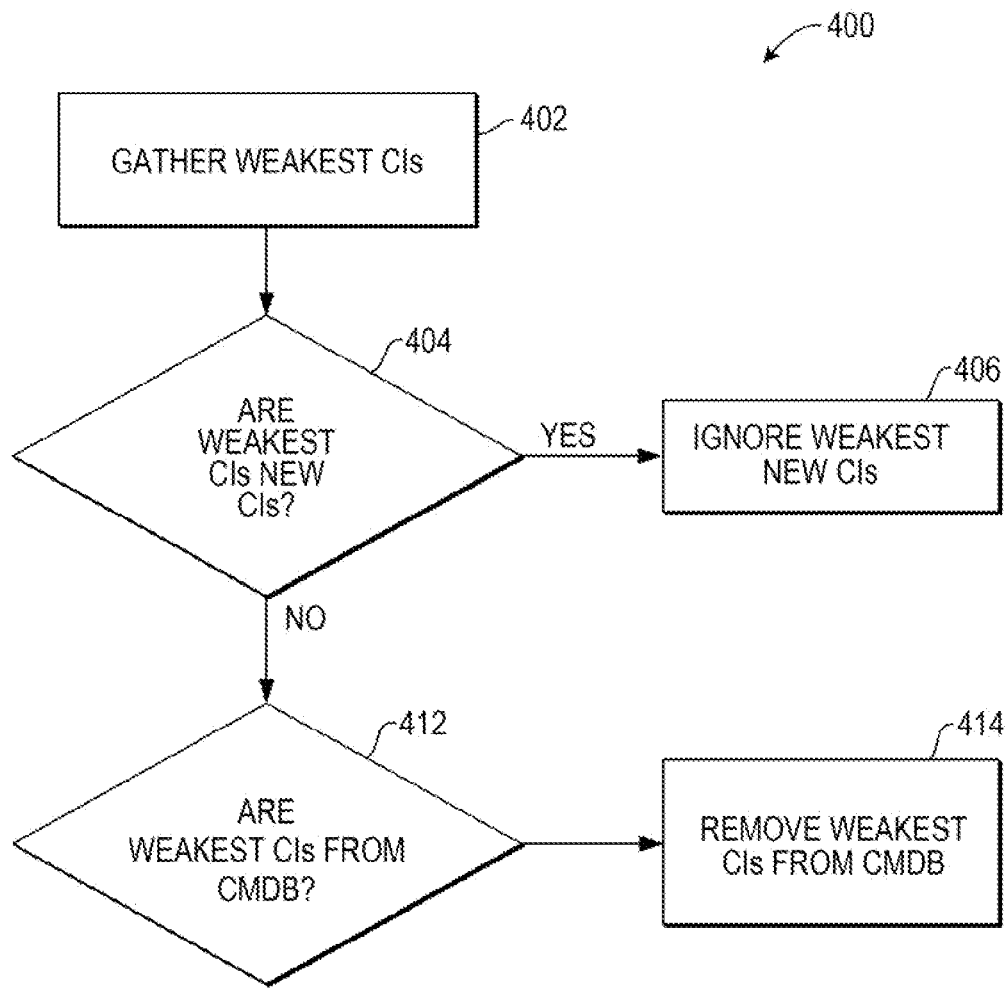
FIGS. 4A-D include a flow diagram and a working example of ignoring CIs in accordance with aspects of the disclosure.

FIG. 4A is a more detailed flow diagram of a method 400 for determining whether a CI should be ignored. As shown in block 402, the weakest CIs may be gathered. In one example, the weakest CIs may be those that are associated with more CIs in a plurality of CIs than any other CI therein.

Figure 4B:
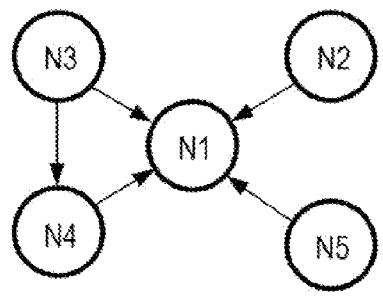

FIG. 4B shows another illustrative graph of CIs set aside as attributes for merging or ignoring. The illustrative CIs shown in the graph of FIG. 4B are: N1-N5. CIs N1-N3 may be newly received input CIs and CIs N4-N5 may be CIs stored in the CMDB. Since there is no plurality of CIs in which each CI is associated with every other CI therein, no CIs in the set shown in FIG. 4B may be merged. Therefore, it may be determined whether any of the CIs may be ignored.

Figure 4C:
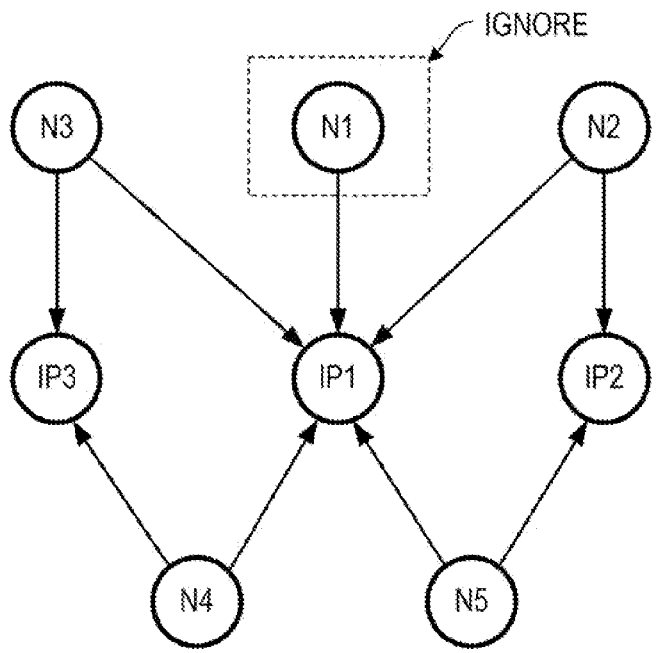

Referring back to FIG. 4A, it may be determined whether at least one newly received CI is the weakest, as shown in block 404. FIG. 4C shows one example of predetermined criteria used to associate CIs. FIG. 4C shows IP address attributes IP1, IP2, and IP3 associated with the plurality of candidate CIs N1-N5. Here, N3 and N4 are associated with two corresponding IP address attributes, IP1 and IP3. The attribute IP1, which is associated with N3 and N4, is equivalent to the corresponding IP address attribute associated with N1. However, the attribute IP3 associated with N3 and N4 is not equivalent to the corresponding attribute associated with N2 and N5, which equals IP2. N1 is the only node in this example whose IP address attribute is equivalent to each corresponding attribute in more CIs than any other CI shown in FIG. 4C. The only IP address attribute associated with N1 is IP1, which is equivalent to the corresponding attribute in N2, N3, N4, and N5. Referring back to FIG. 4A, if at least one newly received CI is the weakest, the at least one newly received CI may be flagged such that it is subsequently ignored, as shown in block 406. Referring back to FIG. 4C, N1 may be deemed the weakest CI since it is associated with more CIs in the plurality of CIs than any other CI therein.

Figure 4D:
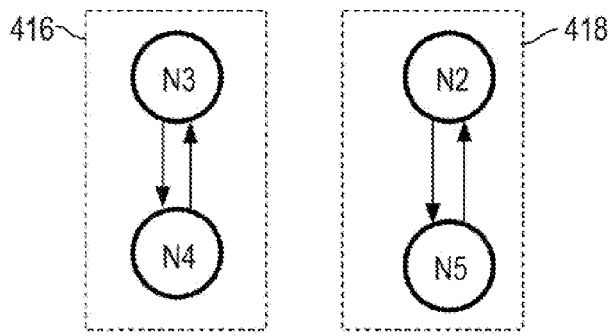

Referring back to FIG. 4A, in block 412, it may be determined whether a CI stored in the CMDB is associated with a non-existing entity. If a CI stored in the CMDB is associated with a non-existing entity, the CI may be removed therefrom, as shown in block 414. In the example of FIG. 4C, if N1 had been stored in the CMDB it may have been removed therefrom, resulting in N1 being subsequently ignored. Referring now to FIG. 4D, once N1 is ignored, two pluralities 416 and 418 become apparent. In each plurality, every CI is associated with every other CI therein, thus each plurality may be merged in the next iteration of the process.

Advantageously, the above-described system and method merges or ignores redundant CIs in the CMDB. In this regard, CMDB data may be arranged efficiently and may be more readily accessed. Furthermore, administrators relying on the CMDB can be rest assured that the information stored therein is an accurate representation of the system.

Although the disclosure herein has been described with reference to particular examples, it is to be understood that these examples are merely illustrative of the principles of the disclosure. It is therefore to be understood that numerous modifications may be made to the examples and that other arrangements may be devised without departing from the spirit and scope of the disclosure as defined by the appended claims. Furthermore, while particular processes are shown in a specific order in the appended drawings, such processes are not limited to any particular order unless such order is expressly set forth herein. Rather, processes may be performed in a different order or concurrently, and steps may be added or omitted.

The invention claimed is:

1. A system comprising:
   a configuration management database to store configuration items, each configuration item including at least one attribute comprising an Internet Protocol (IP) address of an entity in a computer information system;
   at least one processor to:
   determine whether each configuration item in a plurality of configuration items is associated with every other configuration item in the plurality of configuration items;
   in response to determining that each configuration item in the plurality of configuration items is associated with every other configuration item in the plurality of configuration items, merge the plurality of configuration items such that the attributes of the plurality of configuration items are associated with one configuration item;
   in response to determining that each configuration item in the plurality of configuration items is not associated with every other configuration item in the plurality of configuration items:
   in response to determining that a newly received configuration item including an IP address and that is not part of the configuration management database represents a non-existing entity, flag the newly received configuration item such that the newly received configuration item is subsequently ignored; and
   in response to determining that a stored configuration item in the configuration management database represents a non-existing entity, remove the stored configuration item from the configuration management database.

2. The system of claim 1, wherein the at least one processor is to determine whether each configuration item in the plurality of configuration items is associated with every other configuration item in the plurality of configuration items based on a predetermined criteria.

3. The system of claim 2, wherein a given configuration item in the plurality of configuration items meets the predetermined criteria responsive to at least one attribute of the given configuration item being equivalent to at least one attribute of a second configuration item in the plurality of configuration items.

4. The system of claim 3, wherein the at least one processor is to represent each configuration item in the plurality of configuration items as a node in a graph of nodes.

5. The system of claim 4, wherein in response to determining that the given configuration item in the plurality of configuration items meets the predetermined criteria, the at least one processor is to link a node representing the given configuration item to another node representing the second configuration item.

6. The system of claim 1, wherein the plurality of configuration items comprise newly received configuration items and configuration items stored in the configuration management database.

7. The system of claim 1, wherein the newly received configuration item represents a non-existing entity responsive to the newly received configuration item being associated with more configuration items in the plurality of configuration items than any other configuration item in the plurality of configuration items.

8. The system of claim 1, wherein the stored configuration item represents a non-existing entity responsive to the stored configuration item being associated with more configuration items in the plurality of configuration items than any other configuration item in the plurality of configuration items.

9. The system of claim 1, wherein determining whether the newly received configuration item represents a non-existing entity comprises determining whether the newly received configuration item represents an entity that previously existed in the computer information system but has been removed.

10. A non-transitory computer readable medium storing instructions which upon execution cause at least one processor to:
    associate each configuration item to at least one other configuration item in a plurality of configuration items based on a predetermined criteria, each configuration item in the plurality of configuration items representing an entity of an information technology system and including at least one attribute comprising an Internet Protocol (IP) address of the entity, wherein a portion of the plurality of configuration items are stored in a configuration management database;
    determine whether each configuration item in the plurality of configuration items is associated with every other configuration item in the plurality of configuration items;
    in response to determining that each configuration item in the plurality of configuration items is associated with every other configuration item in the plurality of configuration items, merge the plurality of configuration items such that attributes of the plurality of configuration items are associated with one configuration item;
    in response to determining that each configuration item in the plurality of configuration items is not associated with every other configuration item in the plurality of configuration items:
    in response to determining that a newly received configuration item including an IP address and that is not part of the configuration management database represents a non-existing entity, flag the newly received configuration item such that the newly received configuration item is subsequently ignored; and
    in response to determining that a stored configuration item in the configuration management database represents a non-existing entity, remove the stored configuration item from the configuration management database.

11. The non-transitory computer readable medium of claim 10, wherein a given configuration item in the plurality of configuration items meets the predetermined criteria responsive to at least one attribute of the given configuration item being equivalent to at least one attribute of a second configuration item in the plurality of configuration items.

12. The non-transitory computer readable medium of claim 11, wherein the instructions upon execution further cause the at least one processor to represent each configuration item in the plurality of configuration items as a node in a graph of nodes.

13. The non-transitory computer readable medium of claim 12, wherein in response to determining that the given configuration item meets the predetermined criteria, the instructions upon execution further cause the at least one processor to link a node representing the given configuration item with another node representing the second configuration item.

14. The non-transitory computer readable medium of claim 10, wherein the newly received configuration item represents a non-existing entity responsive to the newly received configuration item being associated with more configuration items in the plurality of configuration items than any other configuration item in the plurality of configuration items.

15. The non-transitory computer readable medium of claim 10, wherein the stored configuration item represents a non-existing entity responsive to the stored configuration item being associated with more configuration items in the plurality of configuration items than any other configuration item in the plurality of configuration items.

16. The non-transitory computer readable medium of claim 10, wherein determining whether the newly received configuration item represents a non-existing entity comprises determining whether the newly received configuration item represents an entity that previously existed in the system but has been removed.

17. A method comprising:
associating each configuration item in a plurality of configuration items to at least one other configuration item based on a predetermined criteria, each configuration item in the plurality of configuration items representing an entity of a computer information system and including at least one attribute comprising an Internet Protocol (IP) address of the entity, wherein a portion of the plurality of configuration items are stored in a configuration management database;
determining, by a system including a processor, whether each configuration item in the plurality of configuration items is associated with every other configuration item in the plurality of configuration items;
in response to the determining that each configuration item in the plurality of configuration items is associated with every other configuration item in the plurality of configuration items, merging, by the system, the plurality of configuration items such that attributes of the plurality of configuration items are associated with one configuration item;
in response to determining that each configuration item in the plurality of configuration items is not associated with every other configuration item in the plurality of configuration items:
in response to determining that a newly received configuration item including an IP address and that is not part of the configuration management database represents a non-existing entity, flagging, by the system, the newly received configuration item such that the newly received configuration item is subsequently ignored; and
in response to determining that a stored configuration item in the configuration management database represents a non-existing entity, removing, by the system, the stored configuration item from the configuration management database.

18. The method of claim 17, wherein a given configuration item in the plurality of configuration items meets the predetermined criteria responsive to at least one attribute associated with the given configuration items being equivalent to at least one attribute associated with another configuration item in the plurality of configuration items.

19. The method of claim 17, wherein the plurality of configuration items comprise newly received configuration items and configuration items stored in the configuration management database.

20. The method of claim 17, wherein the newly received configuration item represents a non-existing entity responsive to the at least one newly received configuration item being associated with more configuration items in the plurality of configuration items than any other configuration item in the plurality of configuration items.

21. The method of claim 17, wherein the stored configuration item represents a non-existing entity responsive to the at least one stored configuration item being associated with more configuration items in the plurality of configuration items than any other configuration item in the plurality of configuration items.

* * * * *